H. Waterman.

Tempering Wire.

No. 1874 Reissued Feb. 14. 1865

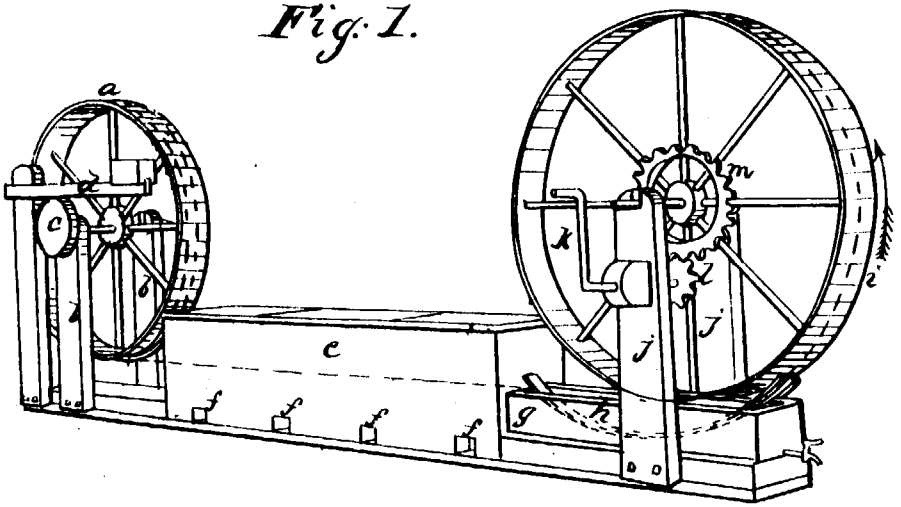

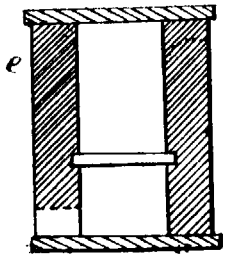

No. 1,874.—HENRY WATERMAN, Brooklyn, N. Y.—*Tempering Wire.*—Patented August 24, 1865; reissued February 14, 1865.

*Claim.*—The process, substantially such as herein described, of hardening steel wire, or other thin steel, of any desired length, which process consists in drawing the wire continuously, while under tension, through the heating medium, and thence through the hardening liquid.

Witnesses:

J. J. Teagh

Inventor

Henry Waterman

BEST AVAILABLE COPY

UNITED STATES PATENT OFFICE.

HENRY WATERMAN, OF BROOKLYN, NEW YORK.

TEMPERING WIRE.

BEST AVAILABLE COPY

Specification forming part of Letters Patent No. 21,286, dated August 24, 1858; Reissue No. 1,874, dated February 14, 1865.

*To all whom it may concern:*

Be it known that I, HENRY WATERMAN, of Brooklyn, Kings county, and State of New York, have invented a new and useful Improvement in Hardening Steel Wire; and I do hereby declare that the following is a full, clear, and exact description thereof, reference being had to the accompanying drawings, making part of this specification, in which—

Figure 1 is a perspective view of an apparatus suitable for working my said invention, and Fig. 2 a cross-section of the furnace.

Prior to my said invention the process of hardening steel wire and other thin steel was by winding it in a flat coil in the form of a volute and tied with fine wire to hold the coil in form. The coils so prepared were heated to the required temperature either in an open fire or in a suitable metallic box, and then plunged in the hardening-fluid, as a solid block of steel would be hardened; but this process was objectionable mainly for the following reasons: First, the coils unavoidably limited the length of wire to be so hardened; second, it was exceedingly difficult, if not impossible, to heat the wire uniformly, and in consequence the parts most heated were most hardened; and, third, the wire while being heated and hardened became crinkled.

The object of my invention is to harden steel wire and thin steel of any desired length uniformly and without becoming crinkled, and at the same time to reduce the expense; and my said invention of a process consists in drawing the wire through the heating and through the cooling and hardening medium that it may be heated and hardened uniformly in transit. The tension consequent upon pulling it through the heating medium while it is in a highly heated state will tend to draw out any crooks, and in drawing it thence through the cooling medium will prevent it from being crinkled by the transition in passing from the heating to the cooling or hardening medium.

The apparatus which I employ in working my said process is represented in the accompanying drawings, in which *a* represents a reel or drum on which the required quantity of steel wire or thin steel is wound. The shaft of this reel is mounted on two standards, *b b*, and it is provided with a wheel, *c*, on the periphery of which a weighted lever, *d*, makes pressure to constitute what is called a friction-brake to resist to any degree required the unwinding of the wire from the reel. The amount of resistance should be adjusted to the strength of the steel to be treated. The end of the steel wire or other fine steel from this reel is passed through a hole in one end of a long furnace, *e*, and carried through the whole length of the furnace and through a corresponding hole in the other end.

A furnace made six feet in length, eight inches wide, with an ash-pit and grate on which to build a fire of anthracite coal of about one foot in depth, I have found to answer a good purpose in practice. Numerous apertures, *f*, should be made along the side wall to supply air to the ash-pit, that every part of the length of the grate may be supplied with a uniform draft, although, if preferred, a blast may be used. The wire is best introduced by attaching the end of it to a rod of iron and then covering it over with the incandescent coals. At the opposite end of the furnace there is a trough, *g*, to contain the cooling or hardening liquid, oil being the best. This vat should be placed close up against the end of the furnace, that the wire may have but a short distance to travel from the heating to the cooling medium. A curved metallic guide-plate, *h*, is placed in this vat, under which the wire is passed, and by which it is guided into the cooling-liquid, and thence up to the periphery of another drum or reel, *i*, the shaft of which is mounted in suitable standards, *j*. I prefer to turn this drum or reel by a crank-handle, *k*, the shaft of which carries a pinion, *l*, which engages the cogs of a wheel, *m*, on the shaft of the reel. By any of the well-known means, such as a screw on the shaft, the reel should be made to move laterally to lay the wire on the periphery of the drum as it is being wound up.

The fire having been properly started, the end of the wire carried through and attached to the periphery of the wheel *i*, and the wire properly covered with the fire, an attendant turns the reel *i*, observing the wire as it comes out of the furnace and on its way to the hardening-liquid, increasing or reducing the motion as he finds the wire getting too much or not sufficiently heated. In this way the wire is drawn under tension from the reel *a* through the fire, by which it is heated to the required temperature, thence through the cooling or hardening medium, and wound upon the reel *i* in a hardened state; and the attendant having ascertained the required velocity at which the reel should be turned to suit the condition of the fire, any length of wire can be hardened uniformly, and, as the wire is under tension in passing through the heating and through the hardening medium, all crooks will be drawn out while it is red-hot, and it will be prevented from crinkling while passing through the hardening medium.

After a given quantity of wire has been thus hardened, the reels may be removed to another place and the motions reversed to wind the wire back onto the reel *a* or some other suitable reel, the wire passing through sawdust, or equivalent substance, at a sufficient heat to remove the oil from the surface of the wire; and then the temper may be drawn by placing the reel with the wire on it in a heated oven and there rotated until the required temper is obtained.

And although I have above described an apparatus such as I have found to answer a good purpose for working my said process, I wish it to be distinctly understood that I make no claim to the said apparatus or mechanism, nor do I limit myself to the use thereof, as other apparatus may be used for working my said process. Nor do I claim as of my invention the mode of removing the oil from the surface of the wire, nor the described process for drawing the temper. And although I prefer to use a friction-brake on the shaft of the drum or reel from which the wire is drawn, any other mode of making resistance may be substituted, as in some instances a very slight resistance will suffice.

What I claim as my invention, and desire to secure by Letters Patent, is—

The process, substantially such as herein described, of hardening steel wire or other thin steel of any desired length, which process consists in drawing the wire continuously, while under tension, through the heating medium and thence through the hardening liquid.

HENRY WATERMAN.

Witnesses:
WM. H. BISHOP,
ANDREW DE LACY.